United States Patent [19]

Bolger

[11] 3,882,494

[45] May 6, 1975

[54] DOPPLER CORRELATION RADAR PROVIDING COMBINED TARGET DETECTION AND RANGING

[75] Inventor: Thomas Vincent Bolger, Pennsauken, N.J.

[73] Assignee: RCA Corporation, New York, N.Y.

[22] Filed: June 11, 1973

[21] Appl. No.: 368,661

[52] U.S. Cl. ........ 343/5 PD; 340/258 A; 343/5 SA; 343/7.7
[51] Int. Cl. ...................... G01s 9/42; G08b 13/22
[58] Field of Search .... 340/258 A; 343/5 SA, 5 PD, 343/7.7

[56] References Cited
UNITED STATES PATENTS

| | | |
|---|---|---|
| 3,181,150 | 4/1965 | Ruppersberg et al. ........... 340/258 A |
| 3,386,090 | 5/1968 | Stevens ............................ 343/7.7 X |
| 3,386,094 | 5/1968 | Kratzer et al. ................... 343/7.7 X |
| 3,388,398 | 6/1968 | Kratzer et al. ................... 343/7.7 X |
| 3,614,785 | 10/1971 | Kratzer .............................. 343/7.7 |
| 3,716,823 | 2/1973 | Thompson et al. ................ 343/5 SA |
| 3,728,721 | 4/1973 | Lee et al. ..................... 340/258 A X |
| 3,733,603 | 5/1973 | Johnston ........................... 343/5 SA |
| 3,778,828 | 12/1973 | McFarland ......................... 343/7.7 |
| 3,781,859 | 12/1973 | Hermans ........................ 343/7.7 X |
| 3,790,938 | 2/1974 | Anderson ........................... 343/7.7 |

Primary Examiner—Malcolm F. Hubler
Attorney, Agent, or Firm—George J. Seligsohn; Edward J. Norton

[57] ABSTRACT

Special types of transmitted code and decoding signals having serial detection and range bins portions permit a single decoder channel to provide a relatively soft aural signal to any detected target not within a selected range bin and a relatively loud aural signal to any detected target within the selected range bin.

6 Claims, 6 Drawing Figures

1.5 TO 2 Km RANGE SUBINTERVAL

Fig. 6

DOPPLER CORRELATION RADAR PROVIDING COMBINED TARGET DETECTION AND RANGING

This invention relates to doppler correlation radar systems and, more particularly, to such a system, employing a single decoder channel, which utilizes, in a preferred embodiment, an aural enhancement method of target range acquisition in which coarse range aural contact is continuously maintained during the acquisition process.

In U.S. Pat. No. 3,386,095, issued to G. H. Stevens on May 28, 1968, there is disclosed a doppler correlation radar system designed particularly for detecting and locating moving targets such as enemy soldiers or vehicles that are moving under cover of darkness or under cover of a forest, for example. In this system, a continuous wave carrier signal is phase modulated in accordance with a preselected binary code, received echo signals are mixed with the carrier signal then being transmitted, and the mixed output is correlated against a locally derived binary decoding signal to produce an audio doppler signal manifesting a moving target. The radar operator listens to the doppler audio signal over phones which are provided. This system may be alternatively operated either in an "all range" mode or a "range bins" mode, depending upon the position of a mode selection switch therein. In the all-range position, one type of coding consisting of a pair of square wave signals, having certain preselected frequencies, are utilized respectively for the preselected code which phase modulates the carrier signal and for the locally derived code which is correlated against the mixed output. This provides a (STC) sensitivity time control that varies the receiver sensitivity as a function of the range of any received moving target so that the doppler signal amplitude of any moving target is substantially independent of the range of the target (i.e., the sensitivity of the receiver varies directly as a fourth power of the range of a moving target, since the power from a received echo of a moving target varies inversely as the fourth power of the range of that target). In the case of the range-bins mode, another type of coding is utilized, which consists of a psuedo-random code as the transmitted preselected code. The same psuedo-random code with a selected delay is employed as the locally derived decoding signal.

In U.S. Pat. No. 3,614,785, issued to D. L. Kratzer on Oct. 19, 1971, there is disclosed a doppler correlation radar system which employs a novel preselected code for phase modulating the continuous carrier signal of the doppler correlation radar system which inherently is capable of providing both (STC) sensitive time control in the performance of the all-range function of the system, while also being inherently capable of performing the range-bins function of the system. This results in a doppler correlation radar system with two time-multiplexed channels for simultaneously manifesting both all-range information and range-bins information.

In manifesting all-range information, both the doppler correlation radar system of U.S. Pat. No. 3,386,095 and U.S. Pat. 3,614,785 provide a single (STC) sensitivity time control for the entire range interval to the maximum range of interest. This single (STC) sensitivity time control is independent of target type and performs the sole function of making the received amplitude and power from any moving target substantially independent of range of that target. Moreover, the detection of a moving target in the all-range mode gives no information at all of the range to that detected moving target. It is therefore, necessary in the range-bins mode to search throughout the entire group of different range bins until the particular range bin in which the detected target resides is located.

In accordance with the present invention, the all-range mode of operation is eliminated as a separate function. Instead, the detection of a moving traget is combined with the range-bins function in a single decoder channel which provides both a coarse range and a fine range capability. As implemented in the present invention, this capability provides for both faster and more reliable acquisition of the range of a moving target then being observed.

Briefly, this is accomplished in the present invention by preferably breaking up the maximum range of interest into a predetermined plural number of coarse range subintervals and employing a different pair of encoded transmitting signal and decoding signal for each coarse range subinterval, although the present invention also contemplates only a single range interval. Each encoded transmitting signal and each decoding signal is cyclic, with each cycle including respective, serially-occurring, detection and range-bins portions. Correlation is provided for the detection portion over the entire coarse range interval then being observed with a sensitivity which depends upon the particular range of an observed moving target within that coarse range subinterval. Additional correlation is provided for the range-bins portion only when the particular range bins, which has been selected, is the range bin in which the observed moving target is located. Thus, a radar operator, by listening over earphones for an audio frequency manifesting the doppler frequency signature of a moving target within a coarse range subinterval being observed, detects the presence of such a moving target as a relatively low-volume doppler frequency signature signal. He then determines the fine range to this target by selecting that particular range bin which results in the volume of the doppler frequency signature that is then being heard becoming significantly louder.

These and other features and advantages of the present invention will become more apparent from the following detailed description taken together with the accompanying drawing, in which:

Figure 1:
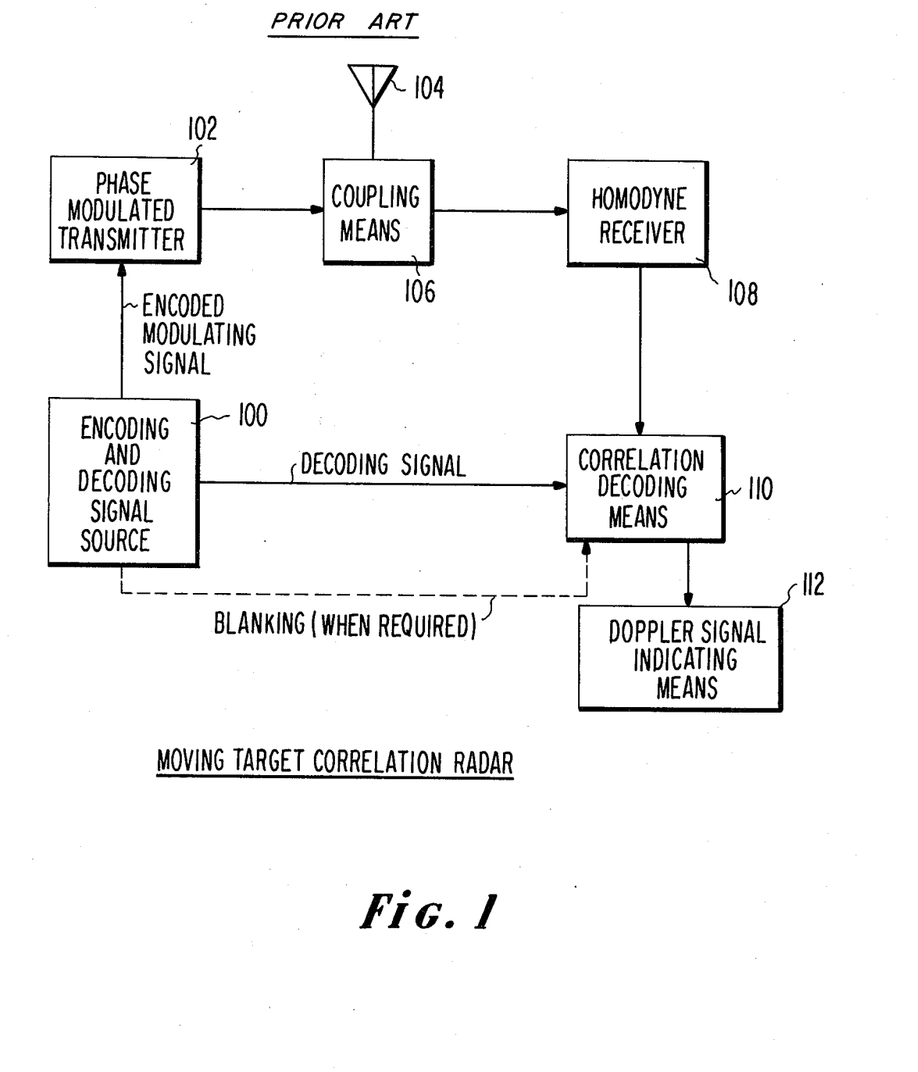
FIG. 1 is a block diagram of a typical doppler correlation radar system.

Referring to FIG. 1, there is shown a block diagram of a moving target correlation radar which is generic to the systems disclosed in each of the aforesaid U.S. Pat. Nos. 3,386,095 and 3,614,785 as well as the system of the present invention.

As shown in FIG. 1, encoding and decoding signal sources 100 applies an encoded modulating signal as an input to phase-modulated transmitter 102. By way of example, the carrier frequency of phase-modulator transmitter 102 may be at 9250 MHz. The encoded modulating signal is in the form of a stream of binary bits. The relative phase of the carrier-frequency output of transmitter 102, when phase modulated by bits manifesting a binary ONE, differs by substantially 180° from the carrier-frequency output thereof when phase modulated by the bits manifesting a binary ZERO. The phase-modulated carrier frequency output transmitter 102 is forwarded to antenna 104 by coupling means 106, which may include a circulator. Coupling means 106 also couples a small portion of the phase-modulated output of transmitter 102 directly to the input of homodyne receiver 108. Antenna 104, besides transmitting the signal forwarded thereto by coupling means 106 from transmitter 102, also receives target echo signals. These target echo signals are forwarded by coupling means 106, such as through the circulator thereof, to the input of homodyne receiver 108. Homodyne receiver 108 includes a balanced mixer for hetrodyning the target echo signal input thereto against the directly-forwarded input thereto from transmitter 102. Such hetrodyning results in a substantially zero beat (DC) signal in response to received echoes from all stationary targets. However, in response to received echoes from a moving target, such hetrodyning results in a non-zero beat signal which includes a doppler frequency component. This doppler frequency component is applied from homodyne receiver 108 as the doppler signal input to correlation decoding means 110.

Corresponding to any encoded modulating signal produced by encoding and decoding signal sources 100 is at least one decoding signal. This decoding signal is applied as a reference input to correlation decoding means 110. In certain cases, as in either the all-range or range-bins mode of the system disclosed in the aforesaid U.S. Pat. No. 3,386,095, correlation decoding means 110 is operated continuously. When this is so, there is no need to ever blank correlation decoding means 110 and, therefore, encoding and decoding signal sources 100 does not provide a blanking signal. However in other cases, such as in the system disclosed in the aforesaid U.S. Pat. No. 3,614,785 and in the system of the present invention, correlation decoding means 110 is operated discontinuously. In these other cases, encoding and decoding signal sources 100 provides a blanking signal to correlation decoding means 110 to disable correlation decoding means 110 at certain times to thereby permit correlation decoding means 110 to operate only intermittently to produce a doppler signal output therefrom. The doppler output from correlation decoding means 110, whether or not correlation decoding means 110 is operated continuously or discontinuously, is appled as an input to and is manifested by a doppler signal indicating means 112.

As more fully described in the aforesaid U.S. Pat. No. 3,386,095, when the moving target correlation radar system disclosed therein is operated in its all-range mode, the encoded modulating signal is a square wave having a first frequency, such as 150 KHz for example, and the decoding signal is a square wave having a second frequency double the first frequency, such as 300 KHz for example. In this all-range mode of the system disclosed in the aforesaid U.S. Pat. No. 3,386,095 correlation decoder means 110 provides an output manifested by doppler signal indicating means 112 for all targets within a certain maximum range receiver by antenna 104. Furthermore, the sensitivity of correlation decoding means 110 will vary substantially as the fourth power of the range to a target, so that the amplitude of the doppler signal output from correlation decoding means 110 will be substantially independent of the range to a target, i.e., correlation decoding means 110 will exhibit sensitivity time control (STC). Thus, in the all-range mode, the moving target correlation radar detects the presence of a target, but does not give any indication of the range thereto.

In the range-bins mode of the aforesaid U.S. Pat. No. 3,386,095, the encoded modulating signal comprises successive sequences of the same pseudo-random binary-bit code group. By way of example, this code group may consist of a series of 1,023 bits (the number of bits of a maximum-length pseudo-random code generated by a shift register having ten stages).

The corresponding locally derived decoding signal comprises the product of encoded modulating signal delayed selectively by an amount corresponding to the approximate range of a particular target multiplied by the encoded modulating signal then being transmitted. (The reason for this multiplication is to compensate for the effective multiplication which takes place in the balanced mixer of the homodyne receiver between the received target echo signal and the directly applied transmitted signal from transmitter 102.)

In the aforesaid U.S. Pat. No. 3,614,785, one-half of the bits in each code group sequence of the encoded modulating signal vary in binary value in a pseudo-random manner, while the bits of the other half of each code group all have the same binary value. This type of encoding makes it possible to time-multiplex the all-range function and the range-bins function in the system of U.S. Pat. No. 3,614,785. Correlation decoding means 110, for the system of U.S. Pat. No. 3,614,785, includes two correlation decoders (one for each channel), each of which correlates the doppler signal input against separate decoding signal inputs from encoding and decoding signal sources 100. Furthermore, each of the two channels may employ its own doppler signal indicating means, such as an earphone for all-range and an A.C. meter for range-bins.

The present invention is directed to an improvement in which the target-detection function and the range-bins function of the moving target correlation radar are serially combined in a single decoding channel. Although the range-bins function itself of the moving target correlation radar of the present invention may be of the type disclosed in the aforesaid U.S. Pat. No. 3,386,095, the range-bins function is preferably performed in the manner disclosed in my copending U.S. Patent application Ser. No. 368,660, filed on even date herewith and assigned to the same assignee as the present application. The target-detection function of the present invention employs principles broadly disclosed in my copending U.S. Patent application Ser. No. 368,869, filed on even date herewith and assigned to the same assignee as the present application.

Figure 2:
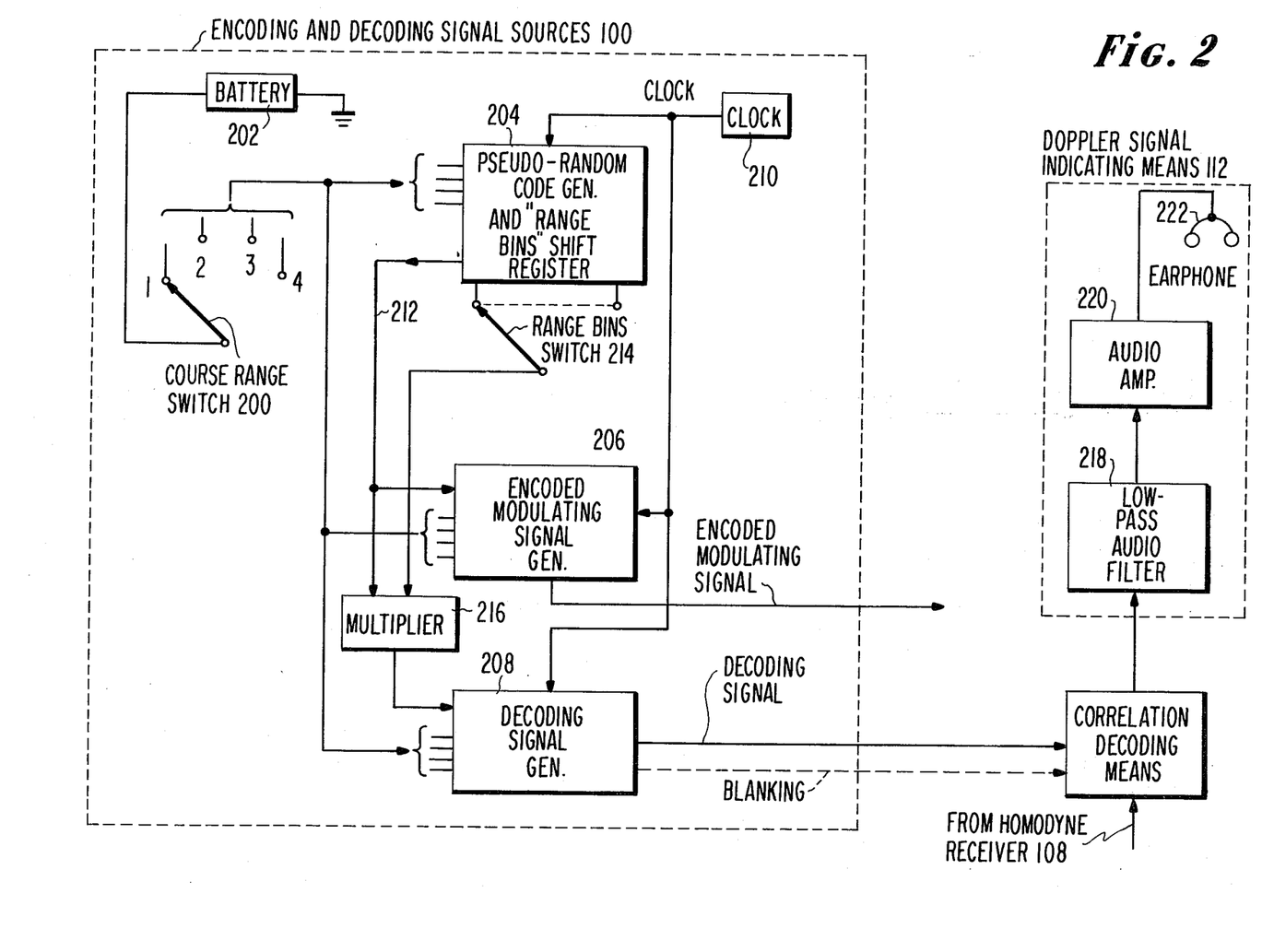
FIG. 2 is a functional block diagram of a doppler correlation radar system of the type shown in FIG. 1 incorporating the present invention, and FIGS. 3-6 inclusive, show timing diagrams helpful in explaining the operation of the present invention.

Referring now to FIG. 2, there is shown an illustrative embodiment of encoding and decoding signal sources 100, correlation decoding means 110 and doppler signal indicating means 112 of a moving target correlation radar of the type shown in FIG. 1 which performs in accordance with the principles of the present invention. As shown, encoding and decoding signal sources 100 of FIG. 2 include coarse range switch 200 for applying a marking signal obtained from battery 202 through any selected one of four control inputs of each of pseudo-random code generator and range-bins shift register 204, encoded modulating signal generator 206 and decoding signal generator 208. Each switch position of coarse range switch 200 corresponds to a different coarse range interval into which the maximum range of interest is divided. A sequence of clock pulses from clock 210 is applied, as shown, as an input to each of pseudo-random code generator and range-bins shift register 204, encoded modulating signal generator 206 and decoding signal generator 208. By way of example clock 210 may operate at a frequency of 6 MHz, which provides a range-bins resolution capability of 25 meters.

As is taught in the aforesaid U.S. Pat. No. 3,386,095 and in my copending U.S. Pat. application Ser. No. 368,660, a pseudo-random code generator and range-bins shift register repetitively generates a pseudo-random code group of a sequence of bits on output conductor 212. The number of bits contained in each successive pseudo-random code group is normally $(2^n-1)$, where $n$ is a selected bit integer. In the case of generator 204, the value of $n$ is selected in accordance with the setting of coarse range switch 200, as is more fully discussed below. Further, each tap of range-bins switch 214, as is known, is associated with a stage of the shift register portion of block 204. A delayed version of the output on conductor 212 appears on each tap of range-bins switch 214 with the amount of delay depending upon the ordinal position of the shift register stage with which that tap is associated. In the present invention, block 204 includes gates responsive to the setting of coarse range switch 200 for selectively associating range-bins switch 214 with different groups of shift register stages. As is shown, the wiper of range-bins switch 214 may be selectively set at any tap thereof, each tap corresponding to a different range bin.

The output from block 204 on conductor 212 is applied as a signal input to encoded modulating signal generator 206 and is also applied as a first input to multiplier 216. The delayed pseudo-random code output present on the tap with which the wiper of range bins switch 214 is then associated is applied as a second input to multiplier 216. The output from multiplier 216, manifesting the digital product of the first and second inputs thereto, is applied as a signal input to decoding signal generator 208. Encoded modulating signal generator 206 is a logic circuit responsive to the inputs thereto for generating an encoded modulating signal output therefrom having any one of a group of certain predetermined formats selected by the setting of coarse range switch 200. The encoded modulating signal, after phase modulating a carrier signal, forms the transmitted signal of the moving target correlation radar system, as shown in FIG. 1. The various formats of the encoded modulating signal and transmitting signal provided by the generator 206 will be discussed in more detail below.

The decoding signal generator 208 is a logic circuit responsive to the inputs thereto for respectively generating as a decoding signal output and a blanking output therefrom having any one of a certain predetermined group of formats selected by the setting of coarse range switch 200. These formats will be discussed in more detail below. The decoding signal and blanking outputs from decoding signal generator 208 are applied, as shown, as inputs to correlation decoding means 110. The output from homodyne receiver 108 of FIG. 1 is applied as a signal input to correlation decoding means 110.

The decoded output from correlation decoding means 110 is applied as an input to doppler signal indicating means 112, which constitutes low-pass audio filter 218, audio amplifier 220 and earphone 222. The doppler signal indicating means 112 is structurally and functionally identical to the doppler signal indicating means disclosed in my copending application, Ser. No. 368,660.

For illustrative purposes, in explaining the operation of the structure shown in FIG. 2, it will be assumed that the range resolution of a range bin is 1525 meters, the maximum range of interest is 3 kilometers and that this maximum range of interest is broken down by coarse range switch into four different range subintervals. The first of these four range subintervals extends from 0 to 1 kilometer; the second of these four subintervals extends from 1 to 1.5 kilometers; the third of these range subintervals extends from 1.5 to 2 kilometers, and the fourth of these four range subintervals extends from 2 to 3 kilometers. In describing the operation of the structure shown in FIG. 2, reference will be made to each of FIGS. 3–6, which respectively show the timing diagrams for each of the four different range subintervals selected by coarse range switch 200.

When coarse range switch 200 is in its first position, it applies a marking signal to pseudo-random code generator 204 which selects the value of the code group interger $n$ to provide a nominal length for the code group which is preferably about equal to one-fourth the maximum range of interest. Under the assumed conditions, where the maximum range of interest is 3 kilometers, the nominal value of a code group when coarse range switch 200 is in its first position is 0.75 km. As is known in the art, the value of the integer $n$ is determined by the number of stages of the shift register of block 204 which are included in the feed-back path of the pseudo-random code generator. If clock 210 has an operating frequency of 6 MHz, so that a clock period corresponds to 25 meters as is assumed, a value of the integer $n$ equal to 5 will result in a pseudo-random code group of 31 serial bits, corresponding to actual range interval of 0.775 km., very close to the nominal value of 0.75 km.

When coarse range switch 200 is in its second position, pseudo-random code generator 204 also selects an integer $n$ having a value of 5, to thereby also provide a code group having a nominal duration corresponding to one-fourth the maximum range of interest or, under the assumed conditions, a nominal value of 0.75 km. However, when coarse range switch 200 is in either its third or fourth positions, psuedo-random code generator 204 selects a value for $n$ of 6, rather than 5. This provides a code group of 63 serial bits having an actual duration corresponding to 1.575 km. This actual value is close to a desired nominal value of about one-half the maximum range of interest or, under the assumed conditions, 1.5 km.

Figure 3:
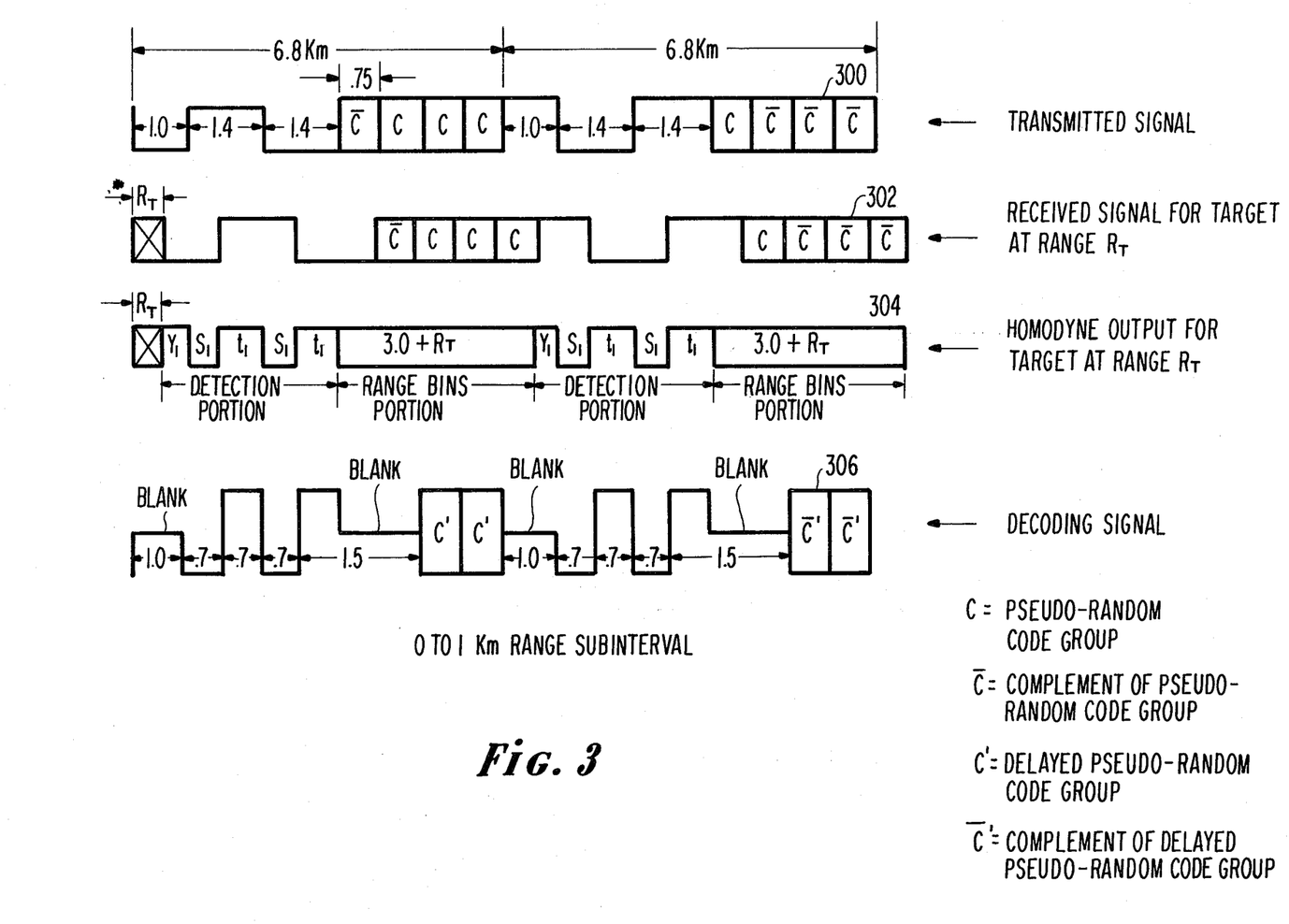

When coarse range switch 200 is in its first position, encoded modulating signal generator 206 generates a cyclic encoded modulating signal, each cycle thereof having the format shown for the transmitted signal in FIG. 3, which is employed for the 0 to 1 km. range subinterval selected by the first position of coarse range switch 200.

Referring to FIG. 3, the first half-cycle of the format for the transmitted signal (encoded modulating signal) shown in the top graph 300, consists of the negative portion having a duration corresponding to 1 km., followed by a positive portion having a duration corresponding to 1.4 km., followed by a negative portion having a duration corresponding to 1.4 km., and followed by 4 code group periods each having a nominal duration corresponding to 0.75 km. Each of the last three of the four code groups, designated C, is a pseudo-random code group identical in all respects to that applied to encoded modulating signal generator 206 from pseudo-random code generator 204 over conductor 212. The first of the four code groups, designated $\overline{C}$, is the complement of a pseudo-random code group C. By complement is meant that each serial bit of a code group $\overline{C}$ has a binary value which is a complement of the binary value of the corresponding bit of a pseudo-random code group C. This may be accomplished in decoded modulating signal generator 206 by multiplying a pseudo-random code group C by the value minus 1 at the appropriate time during the generation of the first half-cycle of the encoded modulated signal. As shown in FIG. 3, the second half-cycle of the format for the transmitted signal is the inverse of the first half-cycle thereof. The reason for this inverted second half-cycle is to take advantage of the techniques described more fully in my copending application, Ser. No. 368,660 for reducing time sidelobes in a doppler correlation radar system and to maintain the average video signal at zero.

The echo signals received from any target at a range $R_T$ has a format identical to that of the transmitted signal except for a time delay with respect to the transmitted signal corresponding to the range $R_T$ of that target, as shown in graph 302 of FIG. 3. In graph 302, the delay $R_T$ may have any given value between 0 and 1 kilometers.

As discussed in connection with FIG. 1, homodyne receiver 108 includes a balanced mixer which has both the transmitted signal and the received signal applied as respective inputs thereto, and this balanced mixer effectively multiplies the two inputs thereto. For this reason, the format of the output from homodyne receiver 108, which is applied as a signal input to correlation decoding means 110 is that shown in graph 304 of FIG. 3. In particular, both the first and second half-cycle portions of graph 304 includes a range bins portion and a detection portion. The range-bins portion covers that time period in which either a code group is being transmitted or a code group is being received. By comparing graphs 300, 302 and 304, it will be seen that the duration of each range-bins portion, corresponds with a range interval of 3 km. (four successive code groups of 0.75 km. each) plus a delay $R_T$ for a target at a range $R_T$. During each detection portion, graph 304 will have a positive polarity at all instances of time when both the transmitted signal and the received signal have the same polarity as each other and will have a negative polarity at all instances of time when the transmitted signal and the received signal have different polarities from each other.

As shown, each detection portion consists of a $r_1$ region followed in order by a $s_1$ region, a $t_1$ region another $s_1$ region and another $t_1$ region. The $r_1$ region has a positive polarity and has a duration equal to the difference between 1 km. and the delay for a target at a range $R_T$. Each $s_1$ region has a negative polarity and has a duration just equal to the delay of the target at range $R_T$. Each $t_1$ region has a positive polarity and has a duration equal to the difference between 1.4 km. and the delay for a target at range $R_T$. Thus, the sum of the contiguous pair of $s_1$ and $t_1$ region is always 1.4 km.

The format of the decoding signal and blanking outputs of decoding signal generator 208 when coarse range switch 200 is in its first position is shown in graph 306 of FIG. 3. Each cycle of the decoding signal shown in graph 306 occurs isochronously with a cycle of the transmitted signal shown in graph 300. In particular, each cycle of the decoding signal shown in graph 306 may be divided into first and second half-cycles each of which consists of a blank region having a duration corresponding to 1 km., followed in order by a negative region, a positive region, another negative region and another positive region, each having a duration corresponding to 0.7 km., then followed by another blank region having a duration corresponding to 1.5 km., and finally by two contiguous code group periods each having a duration corresponding to 0.75 km. It should be noted that the two contiguous code group periods of each half-cycle of the decoding signal shown in FIG. 306 occur isochronously with the last two of the four contiguous code group periods of the corresponding half-cycle of the transmitted signal shown in graph 300. Each of the two code groups, designated C', of the first half-cycle of the decoding signal shown in graph 306 is identical to the code group applied from the output of multiplier 216 as an input to decoding signal generator 208, while each of the code groups designated $\overline{C}'$, of the second half-cycle of the decoding signal shown in graph 306 is the complement of code group C'.

The respective bits of the pseudo-random code of code group C' (and hence the respective bits of the pseudo-random code of code group $\overline{C}'$) have a polarity determined by respective polarities of the corresponding bits of the two pseudo-random codes applied as respective inputs to multiplier 216. In particular, the first of the two inputs to multiplier 216 consists of the pseudo-random code C present on conductor 212, which together with its complement $\overline{C}$ form the pseudo-random code of the transmitted signal. The pseudo-random code applied as a second input to multiplier 216 is a delayed pseudo-random code in which the amount of delay is determined by the particular tap with which the wiper of range bins switch 214 has been associated. As mentioned earlier, the purpose of multiplier 216 is to compensate for the multiplication of the received signal with the transmitted signal which inherently takes place in homodyne receiver 108. In this manner, when the delay selected by the setting of range bins switch 214 is substantially equal to the delay experienced by a received signal from a target at range $R_T$, correlation will exist between the pseudo-random codes present in the output from homodyne receiver 108 and that effectively delayed code groups present in the output from decoding signal generator 208, both of which are applied as inputs to correlation decoding means 110.

In general, the amplitude (power) of the output signal from correlation decoding means 110, due to a target at range $R_T$, depends both on the amplitude (power) of the echo signal received from this target and the amount of correlation which exists between the signal presented as a signal input to correlation decoding means 110 from the output of homodyne receiver 108 and the decoding signal input to correlation decoding means 110 from decoding signal generator 208.

More specifically, no correlation takes place during those periods when correlation decoding means 110 is blanked. Also, unless range bins switch 214 is set to the range bin corresponding with the range of the target at range $R_T$, negligible correlation takes place during the occurrence of code group $C'$ and $\bar{C}'$, of the range-bins portion of the homodyne output for a target at range $R_T$. Thus, during the detection portion of the homodyne output for a target at range $R_T$, no correlation takes place during the $r_1$ region thereof, because the $r_1$ region always occurs when the decoding signal is blanked. However, a certain amount of correlation always takes place during the $s_1$ and the $t_1$ regions of the detection portion of the homodyne output for a target at range $R_T$.

In particular, with the decoding signal shown in graph 306, the correlation is a maximum when the target is at a range of 0.7 km., at which value the duration of both regions $s_1$ and $t_1$ correspond with a range of 0.7 km. For target ranges of less than 0.7 km., the correlation decreases towards zero as the target range decreases towards zero. (However, the received signal amplitude (power) itself increases as the target range decreases towards zero.) For target ranges greater than 0.7 km., the correlation decreases towards zero as the target range increases towards 1.4 km. (In this case, both the received signal amplitude and the correlation both decrease as the target range increases from 0.7 km. However, in the 0 to 1 km. range subinterval, shown in FIG. 3, only target ranges out to 1 km., where the correlation still remains quite high are of interest.)

The sensitivity with which correlation decoding means 110 operates depends not only on the amount of correlation which exists when correlation decoding means 110 is not blanked, but the percentage of the total time of each cycle during which correlation decoding means 110 is not blanked. If correlation decoding means 110 were not blanked at all and there were 100 percent correlation during each complete cycle, the relative power and amplitude of the output signal from correlation decoding means 110 would be unity. However, in the actual case, where correlation decoding means 110 is blanked for a portion of the time, the relative power of the output signal from correlation decoding means 110, assuming 100 percent correlation during the unblanked portion, is equal to the ratio of the unblanked portion of each cycle to the total period of each cycle and the relative amplitude is equal to the square root of this relative power. When the correlation during the unblanking portion of each cycle is less than 100 percent, both the relative power and relative amplitude of the correlation decoding means output is even lower.

Therefore, based on the transmitted and decoding signal formats shown in FIG. 3 and assuming a target has a range of 0.7 km., (so that correlation is a maximum for the detection portion) and range bins switch 214 is set to some other range bin than that one which corresponds to 0.7 km. (so that negligible correlation takes place during the range-bins portion), the relative power of the output signal from correlation decoding means 110 then has a value equal to 2.8/6.8 and the relative amplitude of the output signal from correlation decoding means 110 has a value equal to $(2.8/6.8)^{1/2}$. If range bins switch 214 is now switched to the particular range bin corresponding to 0.7 km., (so that correlation takes place during the code group periods of the decoding signal shown in graph 306, in addition to the detection portion thereof), the value of the relative power of the output signal from correlation decoding means 110 rises to 4.3/6.8 and the relative value of the amplitude thereof rises to $(4.3/6.8)^{1/2}$. Thus, although a radar operator, listening for a doppler frequency target signature signal over earphones 222, will hear (detect) such a signal regardless of the setting of range bin switch 214, the loudness with which he hears the signal is significantly enhanced when he selects the particular range bin corresponding to the range of the detected target. When the range to the target is other than 0.7 km., so that the correlation during the detection portion is not maximum, the relative enhancement in the loudness of the signal heard by the radar operator remains significant.

As mentioned earlier, a preferred embodiment of the present invention makes use of the time sidelobe suppression techniques disclosed more fully in my copending patent application, Ser. No. 368,660. Briefly, this is accomplished by employing pseudo-random code groups each having a duration smaller than the maximum range of interest and by dividing each cycle into two similar but inverted half-cycles. Under these conditions, desired correlated targets still produce a doppler frequency signature signal at a base-band audio frequency determined by the velocity of the target. However, the doppler-frequency signature of spurious time side-lobe detected target modulates a relatively high-frequency carrier at the code group frequency. By applying the output of correlation decoding means 110 through low-pass audio filter 218, which does not pass this modulated carrier frequency, the spurious time side-lobe signals are substantially eliminated.

In the case of FIG. 3, which covers the closest range subinterval of from 0 to 1 km., spurious time side-lobe detected signals of targets having a range greater than 1 km. are not a problem because of the relative weakness with which these more distant signals are received. For this reason, in FIG. 3, both code groups of the first half-cycle of the decoding signal shown in graph 306 are both $\bar{C}'$ pseudo-random code groups, while those shown in the second half-cycle thereof are both $C'$ pseudo-random code groups. In this case, maximum correlation for the range-bins portion will be achieved, when the proper range bins is selected, for all targets having a range from 0 to 0.75 km., the length of a code group. However, due to the fact that the pseudo-random code of the first of the four contiguous code groups, each half-cycle of the transmitted signal, is the complement of the pseudo-random code of each of the last three of the four code groups, results in a lowering of the correlation achieved for the targets having a range from 0.75 km. to 1 km. This is the price that is paid for improvement in supressing the correlation of targets beyond this range subinterval.

Figure 4:
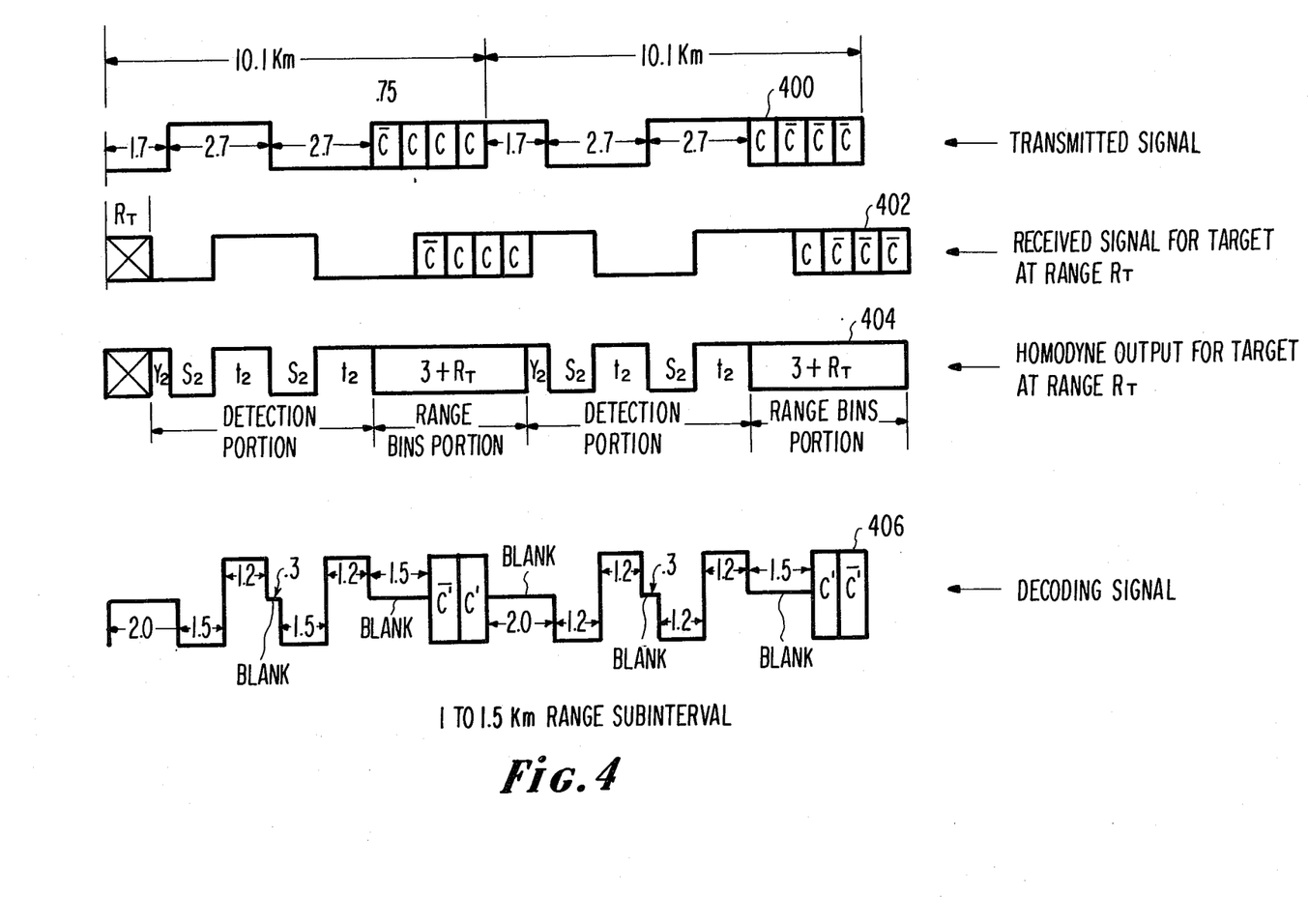
Figure 5:
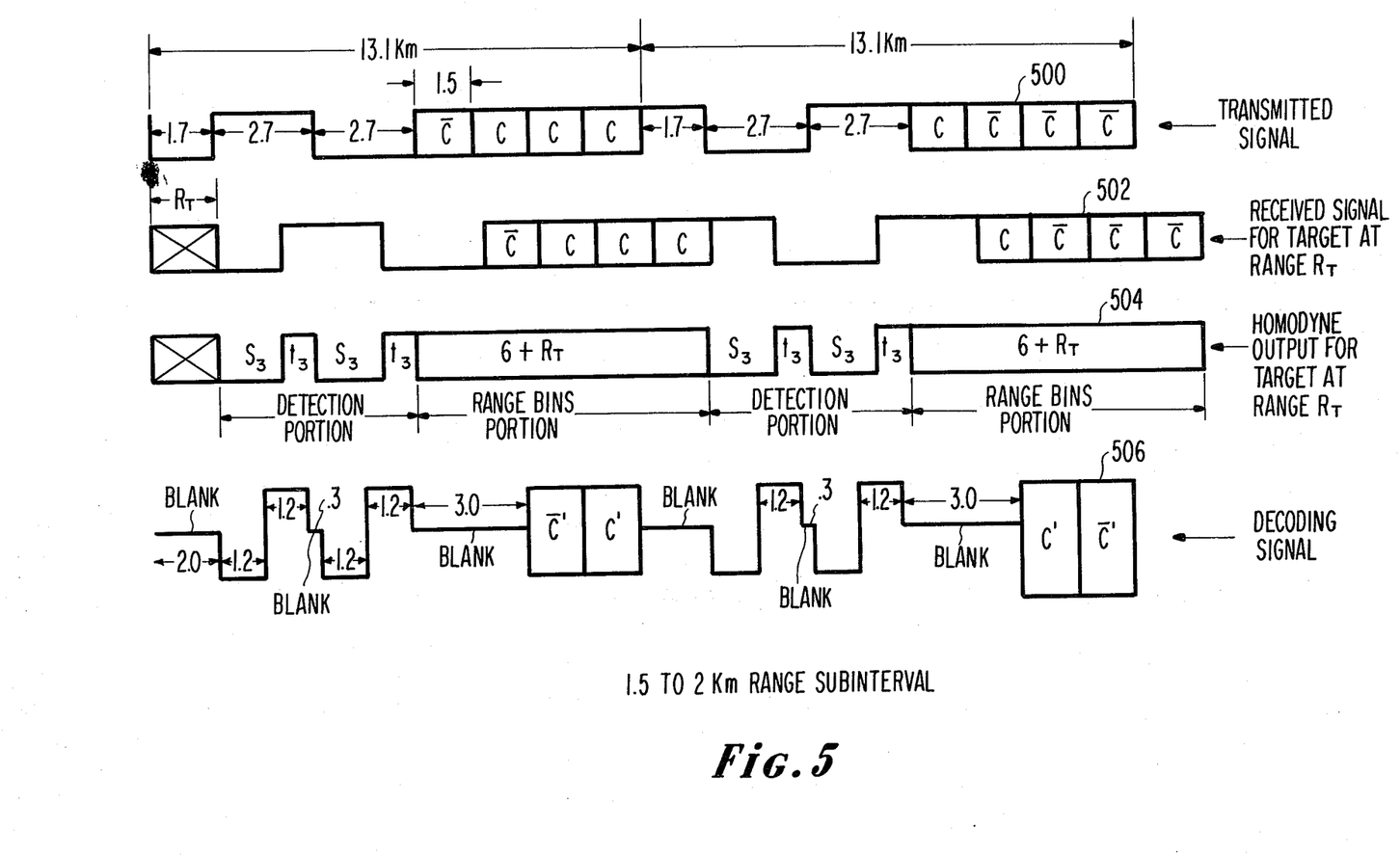
Figure 6:
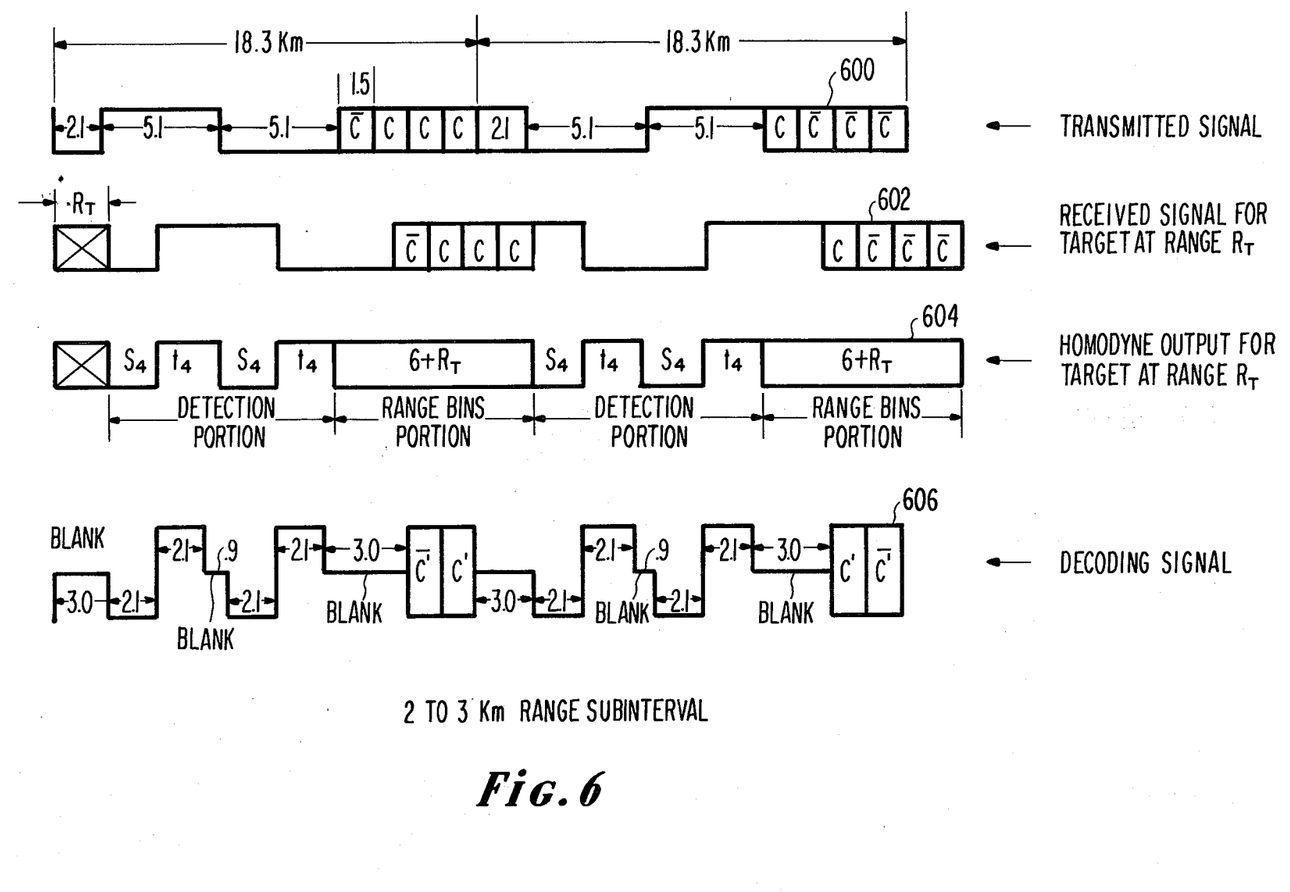

The respective graphs shown in each of FIGS. 4, 5 and 6 are generally similar to those shown in FIG. 3, but relate to different range subintervals. In particular, when coarse range switch 200 is in its position 2, a range subinterval of from 1 to 1.5 km. is selected and encoded modulating signal generator 206 provides a cyclic transmitted signal each cycle of which has a format shown in graph 400 of FIG. 4 and decoding signal generator 208 generates a cyclic decoding signal each cycle of which has a format shown in graph 406 of FIG. 4.

As shown in graph 400, the first half-cycle of the transmitted signal includes a 1.7 km. negative region, followed by a 2.7 positive km. region, followed by a 2.7 km. negative region, followed by four contiguous psuedo-random code groups each of which has a duration of 0.75 km. As in FIG. 3, the first of the four code groups of the first half-cycle manifests a $\overline{C}$ pseudo-random code, while each of the last three of the four code groups thereof manifests a C pseudo-random code. The second half-cycle of the transmitted signal, which is inverted with respect to the first half-cycle, consists of a 1.7 km. positive region, followed by a 2.7 km. negative region, followed by a 2.7 km. positive region, followed by four contiguous code groups each having a duration of 0.75 km. As in FIG. 3, the first of the four code groups of the second half-cycle is manifested by a C pseudo-random code and each of the last three of the four code groups thereof is manifested by a C pseudo-random code. Each half-cycle of the decoding signal shown in graph 406 consists of a 2.0 km. blank region, followed by a 1.2 km. negative region, followed by a 1.2 km. positive region, followed by a 0.3 km. blank region, followed by a 1.2 km. negative region, followed by a 1.2 km. positive region followed by a 1.5 km. blank region, followed by two contiguous code groups each of 0.75 km. duration. The first of the two code groups of the first half-cycle of the decoding signal is manifested by a $\overline{C}'$ pseudo-random code and the second of the two code groups thereof is manifested by a C' pseudo-random code. The first of the two code groups of the second half-cycle of the decoding signal is manifested by a C' pseudo-random code and the second of the two coode groups thereof is manifested by a $\overline{C}'$ pseudo-random code.

The respective formats of the transmitted signal shown in graph 400 and the decoding signal shown in graph 406 are such that when the decoding signal is correlated against the homodyne outputs for a target at range $R_T$, shown in graph 404, maximum correlations for the detection portion takes place for a target at a range of 1.5 km. At this range of 1.5 km., the correlation provided by the detection portion alone provides a value of relative power of the outputs from correlation decoding means 110 of 4.8/10.1, or a relative amplitude of $(4.8/10.1)^{1/2}$. At ranges below 1.5 km. the amount of correlation decreases until the correlation is zero at a range of 0.3 km. or less. Similarly, at ranges above 1.5 km., the correlation decreases until it is zero at a range of 2.7 km. or above. Thus, the detection portion has relatively high correlation sensitivity over the entire 1 to 1.5 km. range subinterval.

When range-bins switch 214 selects the particular range bin which corresponds with the range of the target being observed, the relative power and amplitude of the output from correlation decoding means 110 significantly increases. In the case where the range for the target is 1.5 km. the relative power increases from 4.8/10.1 to 7.8/10.1 and the relative amplitude increases from $(4.8/10.1)^{1/2}$ to $(7.8/10.1)^{1/2}$. For targets at other ranges within the range interval of 1 to 1.5 km., the relative enhancement in the output from correlation decoding means 110 remains significant.

The particular pseudo-random code groups employed in the decoding signal of graph 406 with respect to those employed in the transmitted signal of graph 400 provides essentially zero correlation for relatively-close and therefore relatively strong nearby, spurious time side-lobe targets having a range between 0 and 0.75 km. The amount of correlation between these code groups increases as the range of the target goes from 0.75 km. to 1.5 km. This helps counteract the weakening of the received signal strength for desired targets in a 1 to 1.5 km. range. This feature, per se, forms part of the invention disclosed in my copending patent application, Ser. No. 368,660.

When coarse range switch 200 is in its third position, encoded modulating signal generator 206 and decoding signal generator 208 respectively provide a cyclic transmitted signal having the format shown in graph 500 and a cyclic decoding signal shown in graph 506 of FIG. 5. These graphs of FIG. 5 which cover the range subinterval of from 1.5 to 2 km. are identical to those of FIG. 4 with one exception. FIG. 5 each of the code group periods has a duration corresponding to 1.5 km., rather than 0.75 km. as in FIG. 4. Thus, the operation of the detection portion of FIG. 5 is in all respects the same as that described in connection with FIG. 4. The only difference in the range bins portion, due to the difference in duration of the code groups, is that correlation for all spurious targets have ranges between 0 and 1.5 km. is 0 for the range-bins portion, with the amount of correlation increasing as the target range goes from 1.5 to 3 km. This helps counteract the weakening received signal strength as the target range increases from 1.5 to 2 km. in the range subinterval. Since the time sidelobe problem for targets having a range greater than the maximum range of a subinterval is not a problem, the increased correlation which exists in the 2 to 3 km. range subinterval is not a problem when coarse range switch 200 is in its third position and is operating in the 1.5 to 2 km. range subinterval.

When coarse range switch 200 is in its fourth position, encoded modulating signal generator 206 and decoding signal generator 208 provide the cyclic transmitted signal shown in graph 600 and the cyclic decoding signal shown in graph 606, of FIG. 6. The graphs of FIG. 6 relate to the 2 to 3 km. range subinterval.

The first half-cycle of the transmitted signal of graphs 600 consists of a 2.1 km. negative region, followed by a 5.1 km. positive region, followed by a 5.1 km. negative region, followed by four code groups each having a duration of 1.5 km. The second half-cycle of a transmitted signal shown in graphs 600, which is inverted with respect to the first half-cycle, consists of a 2.1 km. positive region, followed by a 5.1 km. negative region, followed by a 5.1 km. positive region, followed by four code groups each having a duration of 1.5 km. Each of the first and second half-cycles of the decoding signal shown in graph 606 consists of a 3 km. blank region, followed by a 2.1 km. negative region, followed by a 2.1 km. positive region, followed by a 0.9 km. blank region, followed by a 2.1 km. negative region, followed by a 2.1 km. positive region, followed by a 3 km. blank region, followed by two code groups each having 1.5 km. duration. The respective code groups of the transmitted signals showing graph 600 and of the decoding signal shown in 606 manifests the same pseudo-random code as the corresponding code groups of FIG. 4, discussed in detail above.

The detection portion of FIG. 6 provides a maximmum correlation at a range of 3 km., which decreases to 0 as the target range either decreases to 0.9 km. or increases to 5.1 km. Outside of the fact that there are different specific values involved for the 2 to 3 km.

range subinterval shown in FIG. 6, the benefits of operation in the 2 to 3 km. range subinterval, with coarse range switch 200 in its fourth position, are the same as those described in detail in connection with FIGS. 3, 4 and 5.

Although for illustrative purposes, the invention has been described in connection with a predetermined maximum range of interest of 3 km., which is broken down into a predetermined plurality of four preselected contiguous range subintervals, the invention is directed to the novel principles employed rather than to the specific examples utilized. Further, although it is desirable to employ the features of the invention disclosed in my copending application, Ser. No. 368,660, in an embodiment of the present invention, the present invention itself is not restricted to such an embodiment, but in its broader aspects covers any arrangement of moving target correlation radar which provides a single correlation decoding channel for decoding a signal which includes a serially occurring detection portion and a range-bins portion.

What is claimed is:

1. In a moving target correlation radar system of the type comprising means for transmitting a continuous carrier wave modulated with a predetermined encoded modulating signal including a pseudo-random code sequence, means for demodulating echo signals received from any moving target within a given range illuminated with said transmitted signal, range-bins switch means for selectively deriving a delayed pseudo-random code sequence having a delay corresponding to any one of a plurality of different range bins, means coupled to said range-bins switch for generating a decoding signal including a pseudo-random code sequence manifesting the delay selected by said range-bins switch, and doppler-frequency means including correlation decoding means for correlating said demodulated echo signals against said decoding signal to derive an output signal from said correlation decoding means which includes the doppler-frequency signature signal of a moving target having a range within the range bin selected by said range bins switch means; the improvement wherein:

said transmitting means is arranged to provide a cyclic encoded modulating signal, each cycle of said encoded modulating signal including at least one detection portion and one range bins portion which occur serially with respect to each other, said pseudo-random code sequence occurring only during said range-bins portion, said encoded modulating signal having a first format during a detection portion thereof, and said decoding signal generating means is arranged to provide a cyclic decoding signal, each cycle of said decoding signal including at least one detection portion and one range-bins portion which occur serially with respect to each other in predetermined phase relationship with respect to said detection portion and range-bins portion of said encoded modulating signal, said delayed pseudo-random sequence only occurring during said range-bins portion of said decoding signal, and said predetermined phase relationship providing a cooperative relationship in which said delayed pseudo-random code sequence has an appreciable correlation with the pseudo-random sequence during said range-bins portion of said encoded modulating signal as manifested in said demodulated echo signals only when said moving target has a range within the range bin selected by said range-bins switch, said detection portion of said decoding signal having a second format cooperatively related to said first format of said detection portion of said encoded modulating signal so that with said predetermined phase relationship there is provided a partial but significant amount of correlation during said detection portion of said decoding signal when said moving target has a range within any of said plurality of different range bins, whereby the output from said correlation decoding means includes a relatively-low amplitude doppler-frequency signature signal of a moving target having a range within a given one of the range bins when said given one of said range bins is not selected by said range-bins switch and includes a relatively high-amplitude doppler-frequency signature signal of that moving target when said given one of said range bins is selected by said range-bins switch.

2. The system defined in claim 1, including coarse-range switch means for selectively dividing the maximum range of interest into a plurality of different range subintervals, said coarse-range switch means being coupled to said transmitting means, said range-bins switch means and said decoding signal generating means for selecting a different pair of a group of corresponding pairs of predetermined encoded modulating and decoding signals for each different range subinterval with the plurality of range bins associated with any selected coarse range subinterval being within that selected coarse-range subinterval.

3. The system defined in claim 2, wherein each range-bins portion of the encoded modulating signal of each respective pair includes a first number of contiguous code groups each having the same certain duration and each range-bins portion of the decoding signal of that pair includes a second number of contiguous code groups each having said certain duration and wherein each of the code groups corresponding with at least one relatively closer coarse-range subinterval has a duration smaller than that of each of the code groups corresponding with at least one relatively further coarse-range subinterval.

4. The system defined in claim 3, wherein each cycle of the encoded modulating signal of a pair includes a first half-cycle having serial detection and range bins portions and a second half-cycle which is the invert of said first half-cycle, and each cycle of the decoding signal of that pair has a format during the range-bins and detection portions of the respective first and second half-cycles thereof which have said cooperative relationship to the respective first and second half cycles of said encoded modulating signal of that pair.

5. The system defined in claim 4, wherein the range bins portion of the first half-cycle of an encoded modulating signal includes four contiguous code groups with each of the first three code groups manifesting a given pseudo-random code and the fourth code group manifesting the complement of the given psuedo-random code, wherein the first-half cycle of the range-bins portion of each decoding signal includes two contiguous code groups occurring isochronously with the first two of the four code groups of the corresponding encoded modulating signal, each of the two contiguous code groups of the decoding signal corresponding to the closest range subinterval manifesting the same delayed pseudo-random code and each of the two contiguous code groups of the decoding signal corresponding to each other range subinterval manifesting respective delayed pseudo-random codes which are complements of each other.

6. The system defined in claim 4, wherein the detection portion of the first-half-cycle of each encoded modulating signal includes contiguous relatively high and relatively low level predetermined time periods of equal duration with respect to each other, with the duration of the time periods of an encoded modulating signal corresponding to a relatively closer range subinterval being shorter than the duration of the time periods of an encoded modulating signal corresponding to a relatively further range subinterval, said first half-cycle of the decoding signal corresponding to each encoded modulating signal including a pair of relatively high and low level time periods of equal duration with respect to each other which occur entirely during the occurrence of each time period of said corresponding encoded modulating signal, each decoding signal being blank during the part of the detection portion thereof which occurs in the absence of said high and low level time periods thereof.

* * * * *

UNITED STATES PATENT OFFICE
CERTIFICATE OF CORRECTION

PATENT NO. : 3,882,494
DATED : May 6, 1975
INVENTOR(S) : Thomas Vincent Bolger

It is certified that error appears in the above-identified patent and that said Letters Patent are hereby corrected as shown below:

Column 10, line 42, Change "$\overline{C}'$" to --$C'$--

Column 10, line 44, Change "$C'$" to --$\overline{C}'$--

Column 11, line 19, Change "$C$" to --$\overline{C}$--

Signed and Sealed this twenty-eight Day of October 1975

[SEAL]

Attest:

RUTH C. MASON
Attesting Officer

C. MARSHALL DANN
Commissioner of Patents and Trademarks